(12) United States Patent
Chien (10) Patent No.: US 7,726,841 B2
(45) Date of Patent: Jun. 1, 2010

(54) LED LIGHT DEVICE WITH CHANGEABLE GEOMETRIC SYSTEM

(76) Inventor: Tseng-Lu Chien, 8F, No. 29, Alley 73, Lin-Shen Road, Shi-Chi Town, Taipei Hseng (TW)

( * ) Notice: Subject to any disclaimer, the term of this patent is extended or adjusted under 35 U.S.C. 154(b) by 63 days.

(21) Appl. No.: 12/007,076

(22) Filed: Jan. 7, 2008

(65) Prior Publication Data

US 2008/0253121 A1    Oct. 16, 2008

(51) Int. Cl.
    *F21V 21/00* (2006.01)
(52) U.S. Cl. .............................. 362/249.07; 362/249.02; 362/249.06
(58) Field of Classification Search ................. 362/102, 362/565, 800, 249.02, 249.06, 249.07
See application file for complete search history.

(56) References Cited

U.S. PATENT DOCUMENTS 5,954,417 A * 9/1999 Mai ............................ 362/102

* cited by examiner

*Primary Examiner*—John A Ward
(74) *Attorney, Agent, or Firm*—Bacon & Thomas, PLLC (57) ABSTRACT

An LED light device with a changeable geometric system has locks by which at least one LED or LED-unit installed within a housing-unit or joint-may be connected to deliver electric signals from a power source to desired LEDs. The LED light device's geometry will be changed when any variation is made to the positions of the original housing-units or joints.

4 Claims, 7 Drawing Sheets

LED LIGHT DEVICE WITH CHANGEABLE GEOMETRIC SYSTEM

BACKGROUND OF THE INVENTION

This application has subject matter in common with U.S. patent application Ser. Nos. 12/003,691 ("LED light with changeable geometric dimension features"); 12/003,809 ("LED light with changeable features"); 11/806,711 ("Multiple LED light with adjustable angle features"); 10/883,747 ("Fiber Optic light kits for footwear"); 11/092,741 ("Night light with fiber optics"); 11/094,215 ("LED Night light with Liquid optics medium"); 11/255,981 ("Multiple light source Night Light"); 11/498,881 "(Poly Night light"); 11/527,631 ("LED Night light with interchangeable display unit"); 11/498,874 ("Area Illumination for LED night light"); 11/527,629 ("Time Piece with LED night light"); 11/527,628 ("Multiple Function Night light with Air Freshener"); and 11/806,284 ("LED Night light with more than one optics mediums").

The current invention provides a geometric system that enables an LED light device to have a variable shape or construction that enables a user to change the narrow viewing angle of a conventional LED into area illumination and achieve a perfect light device that fits into any limited space and that allows people to modify the LED light device as desired to change the shape and get area illumination with a pre-determined brightness, area, light device shape, and functions provided by conventional electric components such as a switch means, power source, sensor means, conductive means, conductive resilient means, integrated circuit (I.C.), and/or timer means.

The current invention includes conductive means, which may in the form of a wire, metal piece, conductive resilient means, and/or elastic conductive spring within the geometric system's housing to supply electricity from a source of alternative current (A.C.) or direct current (D.C.) through circuit means to illuminate the LEDs in a desired manner.

The geometric system of the invention includes a housing-unit and joint means which enable each element to swivel relative to each other to provide the desired shape. Such a geometric system is similar to puzzle or toy building bricks or other prior art attachment systems that exist in the marketplace. The current invention improves upon the conventional geometric system, puzzle, brick toy, or attachment system, which have several defects including (1) inability to lock a desired angle of each element; (2) inability to bear weight; (3) inability to have elements hanging in the air, (4) inability to fix a desired construction and shape permanently without falling apart when people touch it; and (5) difficulties in assembly due to elements that are too loosely connected.

All the U.S. prior art involving changeable geometric systems, including U.S. Pat. Nos. 5,100,358 (Volgger), 5,137,485 (Penner), 5,472,365 (Engel), 6,176,757 (Lin), 6,186,855 (Bauer et al.), 6,464,553 (Huang), 6,558,065 (Huang), 6,565,406 (Huang), 7,156,392 (Plein), 7,156,392 (Plein), have different constructions for puzzles, brick toys, attachment systems, construction toys, and polyhedral or polygonal elements.

Furthermore, the current invention also involves preferred embodiments that can have geometric dimension changeable properties which may be selected from the group consisting of properties that enable rotation, gap jumping, extension, folding, distance changing, extraction, connection, disconnection, retraction, expansion, addition, adjustment, bending, overlapping, underlying, assembly, disassembly, and flexing.

Prior U.S. patents directed to similar geometric dimension changeable properties, including RE. 32,805 (Engelmore et al.), U.S. Pat. No. 4,590,337 (Engelmore), 4,764,121 (Kang), 4,932,882 (Kang), 5,082,448 (Kang), 5,234,347 (Kang), 5,435,731 (Kang), 6,161,062 (Liao), 6,428,325 (Kurosawa et al.), teach a rotating electric connection for a phone jack, which is different form the current invention, which is for an LED light device in which the LED's terminals are connected with the power source by the changeable geometric system housing-unit and joint-means, using a gear-arrangement and locking device through an extractable contact-bar to connect each of the housing-units and joint-means.

The current invention may further combine the changeable geometric system with locking means, a power source, conductive means, circuit means, switch means, sensor means, timer-means, and/or LEDs to enable the changeable shape LED light device to be used by people anywhere a human being will stay, whether indoors and outdoors.

The current invention improves the marketability of current LED light devices, which are limited to a fixed shape, fixed illumination areas, fixed brightness, fixed viewing angle, fixed design, and bad size for different locations. No current LED light device can fit anywhere, with addable brightness and illumination areas, and additional features such as being bendable to form a wine rack under a cabinet, and providing an additional hook function to hang items inside a kitchen, living room, bathroom, kid's room, entertainment room, garden, patio, boat, car, van, bus, truck, train, airplane, transportation equipment, playground, or outdoors. This improvement addresses both environmental and economic concerns by expanding the usability and attractiveness of LED light devices to have properties that enable users to change the geometric shape to fit anywhere people want power saving LED light kits. The preferred embodiments of the invention additionally all have optional properties to allow people to make different looking LED light devices with required brightness for different illumination areas with self-designed light device shape. Still further, the present invention uses common parts for the housing-unit and joint-unit to form standard equipment and avoid too much plastic, LEDs, or circuit waste to ruin the environment. Thus, the current invention uses very green concepts to provide the LED light device.

The current invention relates to an LED light device that can change LEDs' orientation, or position, or light emitting direction when the geometric dimension of the light device has been changed. This features creates a flexible and changeable shape, dimension, size, position, orientation, illuminated areas, viewing angle, light device value, and light device photometric performance to enable the light device to become a universal choice for all kinds of installation area and different spaces available to improve conventional market LED light kits which are limited to a fixed shape and illumination effects, and especially a narrow beam direction, among other defects.

BRIEF DESCRIPTION OF THE DRAWINGS

FIGS. 2-A and 2-B and 2-C and 2-D and 2-E show a preferred embodiment of a joint means with locking means to allow the joint means to be attached to the housing means with a locking function that enables people to lock desired housing units and joint means to form a desired shape and carry a heavy weight, the respective drawings showing different gear-set arrangements.

FIG. 3-1 shows a preferred embodiment of an LED light device having an exemplary receive means, swivel joint means, LEDs, and optics means arrangement.

FIG. 3-2 shows a preferred embodiment of an LED light device with an exemplary conductive means and receiving means inside the housing-unit, and optics means.

FIG. 3-3 shows a preferred embodiment of an LED light device with an exemplary conductive means, LEDs, switch means, sensor means, and IC means arranged inside the housing-units, and corresponding joint means to provide electric signal delivery between the said housing-unit and joint means.

FIG. 3-4 shows a preferred embodiment of an LED light device with an exemplary arrangement of LEDs inside the housing-unit.

FIG. 3-5 shows a preferred embodiment of an LED light device with an exemplary fixing-means for installing the LED light device on a rope, wire, or track, and in which each of the housing-units and joint means has its conductive means arranged inside to provide electric signal delivery from a power source to desired LEDs, and in which the rope, wire, or track does not have any electric signal passing though.

FIGS. 5-1, 5-2, 5-3, 5-4, 5-5 show preferred embodiments of an LED light device including housing units and joint means that can be changed to any desired combination of orientation, position, light emitting direction, light device shape, dimension, size, illuminated areas, viewing angle, light device value, and light device light photometric performance, and in which all of the housing-units and joint means are the same so that a desired number of the "same" housing-units and joint means can be used to achieve a desired geometric dimension of the light device.

FIGS. 6-1 shows a preferred embodiment with a plurality of housing-units and joint-means having desired LEDs and electric-means, switch means, sensor means and compartments for storage of A.C. or D.C. power source components.

FIGS. 6-2 shows a preferred embodiment of an LED light device including desired housing-unit and optics means arranged to enable change in LED positions, light emitting direction, light beam direction, lighted areas, viewing angle, light photometric performance etc. also can have stencil means selected from the group consisting of stickers, silk-screen, cut-outs, printing, sand blasting or any conventional market available skill to create a logo, message, display, wording, or image to be seen by the viewer.

FIGS. 8-1 shows a preferred electrically conductive means arranged to deliver an electric signal or a plurality of electric signals from one element to other elements including an element with rotating properties, which is perfect for an extendable and retractable LED light device.

FIGS. 7, 8, 9, 10 show a preferred embodiment of an LED light device with extendable and retractable properties, in which some of the LEDs may have the properties to change orientation, position, or light emitting direction, or the device may have shape changing features similar to those disclosed in the above-cited copending application entitled "adjustable angle LED light device's LED-unit."

FIG. 11 shows a preferred embodiment in which each housing-unit includes lock means to fix the housing means at a desired angle and orientation.

DETAILED DESCRIPTION OF THE PREFERRED EMBODIMENTS

Figure 1:
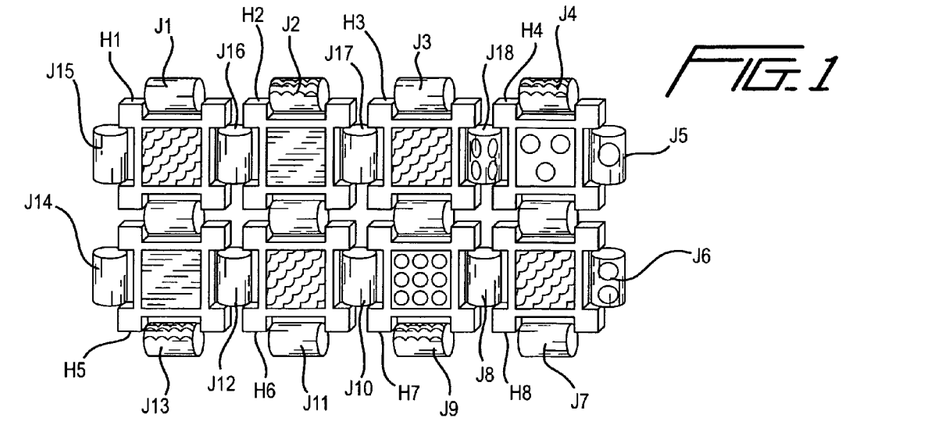
FIG. 1 shows a first preferred embodiment which has a desired number of housing units and joint means to form a LED light device having a changeable geometric system construction.

FIG. 1 shows a preferred geometric system which has a plurality of housing-units (H1), (H2), (H3), (H4), (H5), (H6), (H7), (H8) interconnected by joint-means at four sides of the housing-units. Each of the joint-means (J1), (J2), (J3), (J4), (J5), (J6), (J7), (J8), (J9), (J10), (J11), (J12), (J13),(J14), (J15) and the housing-units can be swiveled and held at a desired position by lock-means (not shown).

Figure 2:
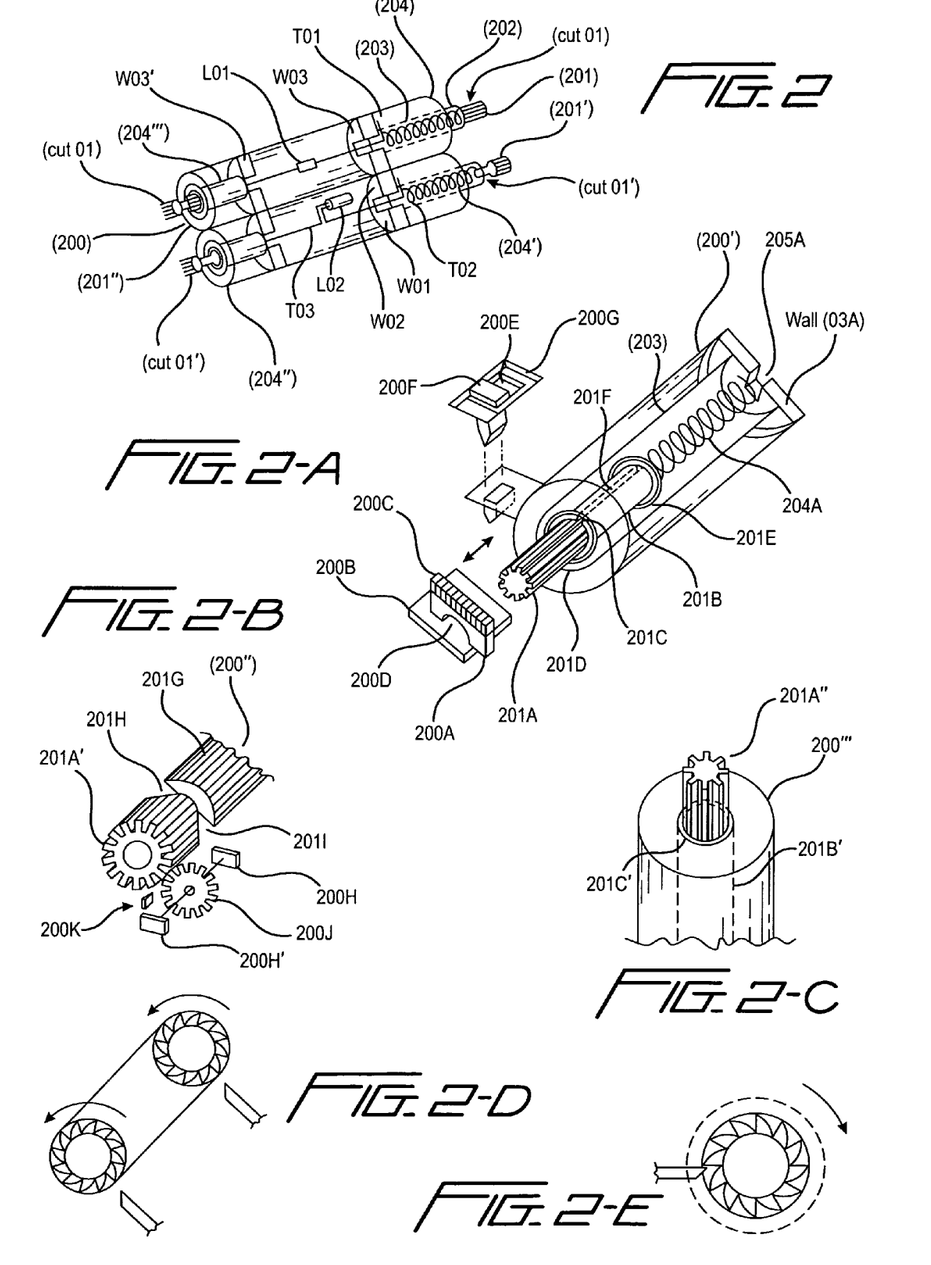
FIG. 2 shows a preferred embodiment of a joint means with retractable ends which can be attached to a housing-unit to prevent the system from falling apart and improve prior art designs subject to the defect that kids are discouraged from using the system because the elements of the prior systems cannot be reliably joined together.

FIG. 2 shows one of the preferred joint-means for the embodiment of FIG. 1. The joint-means (200) has four "8" shaped central contact-bars (201) (201') (201") (201''') having a gear arrangement that causes the contact-bars to freeze or lock at a selected angle against the rotating axis upon application of lock-means.

The contact-bars (201) (201') (201") (201''') each have a base (202) which is biased by conductive resilient means (204), such as the illustrated elastic conductive spring piece, within a groove (203). A one cut-out ditch (cut 01) has a vertical wall on the spring side to allow people to apply a force on the vertical wall to push it to the spring side and move a bar out from the receiving-hole of the housing-unit. This elastic spring also can deliver an electric signal from the housing-unit side to the joint-means though the tip of the bar connected with the housing-unit's conductive means. Hence, the contact-bars have (a) a contact-bar having elastic functions with a vertical cut-out wall on the spring side to allow people disassemble the bar from the receiving hole of the housing-unit; (b) the contact-bar can deliver an electric signal from the housing-unit through the conductive area of the bar and pass through the conductive resilient metal spring into the LED's terminal to cause illumination of the LED with a predetermined light performance; (c) the contact-bars also have a gear arrangement to make the angle adjustable and freeze locking functions to enable the geometric system to maintain a desired shape even when some housing-units and joint-means are in the air. (d) the contact-bars also offer a very strong connection with the housing-units and can support heavy loading for all other housing-units, joint-means, possible circuit means, batteries, sensor means, switch means, or other electric or plastic components because the conduct-bar is deeply inserted into the receiving hole of the housing-unit, in contrast to the prior art; and (e) the contact-bars deliver an electric signal from the contact-bar end through conductive means (204) to one of the LED's terminals (T01). The conductive means (204) are stopped by the groove wall of (200) and inner wall (W03) and are pushed to extend when an outside force is applied to the conductive means (204). The same arrangement applies for contact-bars (201') (201") (201''') so that the LED's two terminals (T01) (T02) are well connected with the housing-unit's electric terminals (not shown) to illuminate the LEDs. The LED's (LD1) two terminals (T01) (T04) are bent to a desired shape and fixed on the wall (W03) and (W03'), and connected with the two conductive means (204) (204'''). The application also can apply to the other LED (L02).

As shown in FIG. 2-A, the contact-bar has a gear-arrangement (201A) on its surface with a base (201E) within a tube (203'). The contact-bar base (201E) and wall (03A) form a space to allow the conductive resilient means (204A) to be moved freely to cause electric signal delivery from the base (201E) to an inner LED electrode (not shown). The joint-means (200') has teeth (201C) to allow the gear-arrangement (201A) to pass though without rotating along the center axis of the contact-bar (201A). As a result, the contact-bar only can be retracted without any rotation along the center axis.

From the FIG. 2-B shows a gear-arrangement on the contact-bar (201A) incorporated with another gear-set (200J) that allows people to adjust the contact-bar angle and cause the housing-unit(s) to be at a certain angle against the joint-means. A proper design enables the contact-bar (201A') to catch other gear-sets (200J) when the contact-bar is inserted into the receiving-hole of the slide surface of the housing-unit so the joint-means and housing-units can be freely rotated as desired. The assembly of the gear-set (200J) and contact-bar (201A') is incorporated with the lock-means (200K) to freeze or hold the gear-set (200J) or contact-bar (201A') and thereby cause it to be locked to stop free movement. This is big improvement over any conventional puzzle, geometric system, brick toy, or LEGO® brick because none of them can be frozen, locked, or hold a shape at all. Furthermore, the solid contact-bars are deeply inserted into the receiving-hole of the slide surface to provide a very tight and solid connection for the joint-means and housing-units so there is no chance to fall apart after assembly work is done, except when the contact-bar been released from the sharp cut-out walls (201I) by a flat screw driver (not shown), other available tool (not shown), or coin edge (not shown).

FIG. 2-C shows other views of the preferred gear-arrangement (201A") of the contact-bar of the joint-means (200'''), in which it can be seen that the teeth (201C') for holding the contact-bar do not move off the axis when retracted along the inner groove (201B').

FIG. 2-D shows an alternative gear-arrangement which does not need any other gear-set (200J) to help because the gear-arrangement on both ends of the joint-means move in only one direction which is counterclockwise, with removable lock-means to stop, freeze, or hold, the housing-units and joint means at a certain angle. As shown in FIG. 2-F, this is a counter-wise gear-arrangement with the lock-means on one end of the joint-means. However, the lock-means and gear-arrangement is not limited to the above preferred embodiments, but rather it will be appreciated that any alternative, equally functional arrangement that achieves the same result assembly set will still fall within the scope of the current invention.

Figure 3:
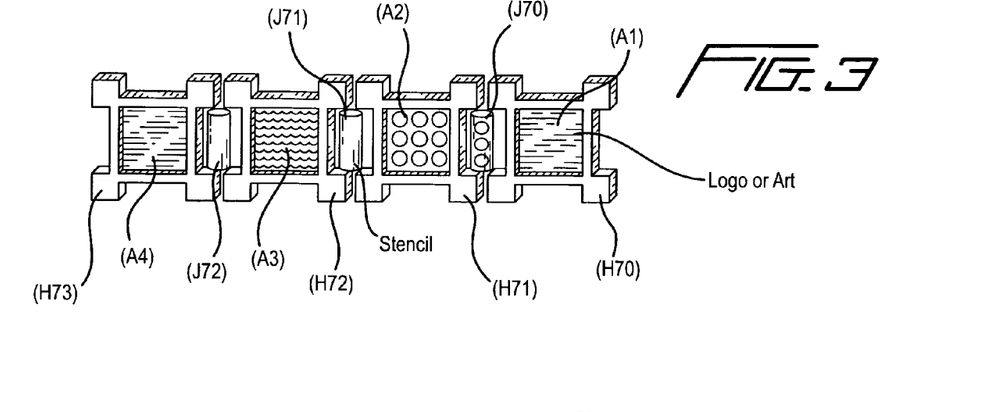
FIG. 3 shows a preferred embodiment of an LED light device with a plurality of housing-units and joint means with varying LED light performance.

FIG. 3 shows details of another preferred embodiment (200') which has a contact bar (201A) and a gear arrangement on its elongate body. The contact-bar has a base (201E) maintains the contact-bar within the groove (203'). Conductive means (204A) are installed within the wall (03A) and base (201E) to enable the contact-bar to be extractable along the groove length. The base (201F) will stop by the joint-means housing gear-like stopper (201C), and allow the contact-bar to be extended by a desired length outside of the joint-means for insertion into the housing-unit's receiving hole. As shown in FIG. 2-B, the gear arrangement contact-bar (201A') works with the second gear-arrangement (200J) to achieve a proper angle and can be locked at the angle by a stopper-means (200H) or more than one stopper-means (200H) (200H'). The contact-bar has one cut-out with two opposite surfaces, one surface (201I) near the spring side being a very sharp vertical surface to allow people to hold and push it to that spring side in order to make the contact-bar become shorter and disassemble the contact-bar from the receiving-hole of the housing-unit. The other side of the cut-out (201H) can be curved so as to prevent people from applying a wrong force and/or direction. FIG. 2-C another view of the preferred embodiment for the contact-bar (20A") and joint-means (200'''), and the relation between the joint-means and the gear-teeth (201C').

FIG. 3 shows a preferred embodiment of the LED light device with a changeable geometric system having illumination on the different housing-units and joint-means for different light performance. The housing-unit (H70) has an optics-means to help to transform the LEDs' narrow viewing angle into a good photometric area light. The area light (A1) looks the same as a conventional light box or computer's screen back light with desired overlay treatment such as an LCD, sticker, film, stencil, cut-out, slogan, advertisement to make an eye-catching promotion medium. The Joint-means (J70) may have three super bright spot-light effects and all the LEDs' light beam supplied directly to the viewer with predetermined light effects which may be implemented by an Integrated Circuit (hereafter as IC). The housing-unit (A2) has a plurality of the LEDs on its central areas. The Joint-means (J71) has area-light effects with a desired promotion medium on a surface of said housing-unit (H70). The other housing-unit (H72) (H73) and joint-means (J72) (J73) may have LEDs or no LEDs on its body according to requirements of the marketplace.

Figure 31:
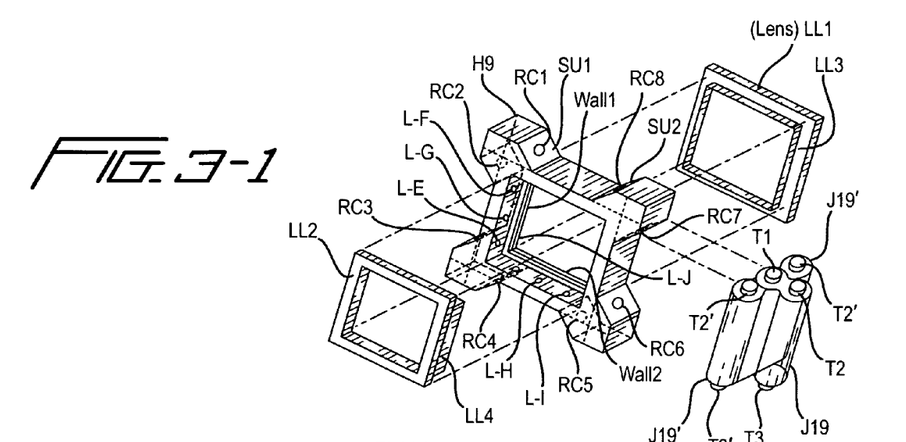

As shown in FIG. 3-1, the housing-unit (H9) has a polygon geometric shape. This embodiment for example is a square having four edges which have a basin on the central area with two slide surfaces (SU1) (SU2). The slide surfaces (SU1) (SU2) are wider on the outer edge and narrow on the inner edge to cause the contact-bar to fit into the two receiving-holes (RC1) (RC8) so that the joint-means are located in-parallel with the inner surface. The slide surface will allow people to easily reach and touch the vertical cut-out of the extractable contact-bar by, for example, a flat screw driver to simplify disassembly of the contact-bar from the said receiving-hole. The wider-edge enables the vertical cut-out of the contact-bar to easily be seen and operated for disassembly of the contact-bar. The joint-means will be the same length as the lower surface, not including the two end contact-bars' length. The retractable contact-bars on two ends of the half of the housing-unit offers a very good connection between the joint-means and the housing-units to achieve a big improvement over conventionally available arrangement having a loose connection, which fall-apart to discourage kids from playing with them.

From FIG. 3-1, The LEDs may install within the housing-units body with chip-form so can incorporated with the optics-means (LL1) (LL2) (LL3) (LL4) to make the said LEDs (L-F) (L-G) (L-H) (L-I) on the left half housing-unit and optics-means (LL2) (LL4) are arranged to make LEDs (L-F) (L-G) (L-H) (L-I) light beams been diffusion by the said optics-means from spot-light into the surface-light or area-light effects. These effects can be seen at computer screen, cellar phone screen as the LED backlight at conventional market place. Hereof, the optics means is not limited to the LED backlight, it is appreciated the optics means should including the overlay or underlay of any material and treatment which can make the said LEDs become more valuable and more practically applications of current inventions which may selected from stencil, cut-outs, silkscreen, sticker, advertisement material, film, light emit beam changing medium, LCD should be still fall within the current invention scope for the said optics means.

Figure 32:
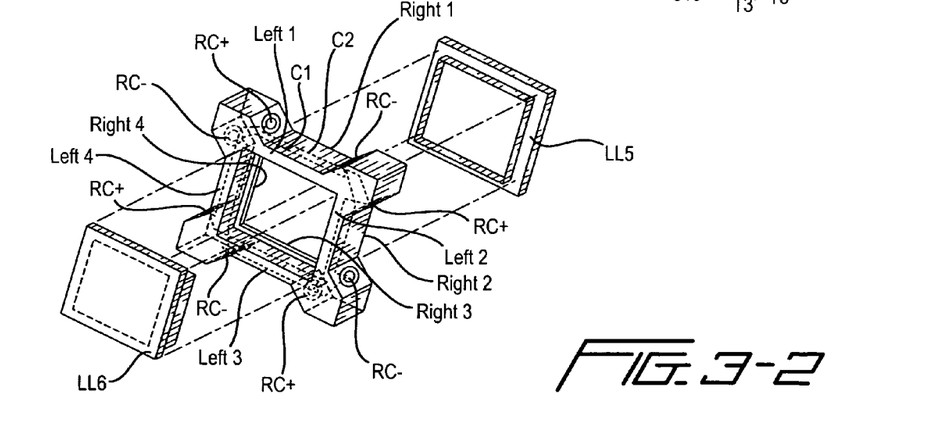

From FIG. 3-2, The conductive means (C1) (C2) which may use the preferred material from group combination selected from conductive metal piece, conductive resilient member, conductive wires, conductive spring coils, conductive rubber or any equivalent or same function material to make the electric delivery route (Right1) (Right 2) (Right 3) (Right4) on the right half of the housing-unit to build a electric route for 4 receiving-holes (RC+) which are located on one slide-surface of each edge of the said housing-unit. The electric route (Left 1) (Left 2) (Left 3) (Left 4) are on the left side of the housing-unit and build the electric route to connect the 4 receiving-holes (RC−) in a route. The Right side electric route and Left side electric route can use the same conductive wires material just only need to reverse and some angle adjustment so can reduce the cost to make the electric route for both half side of the said housing-unit.

Figure 33:
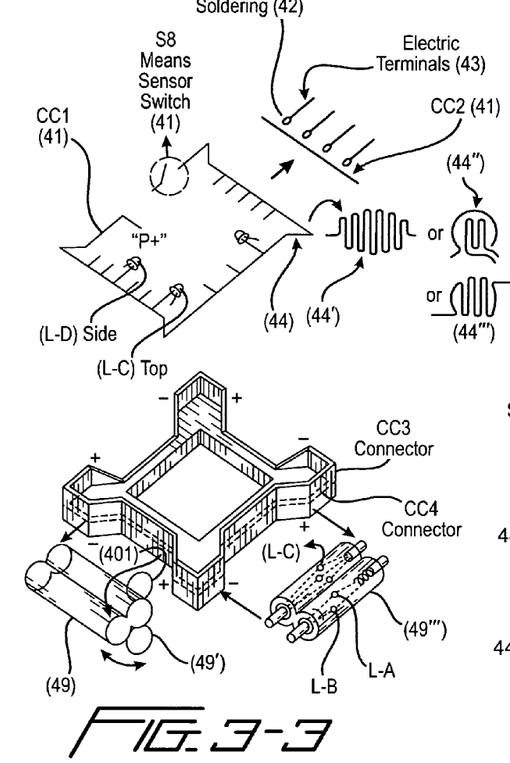

As shown in FIG. 3-3, the housing-units are designed as top and lower levels to make the one electric path on the top level positive and the one electric path on the lower level negative so both electric paths will not short, although an alternative arrangement or equivalent method to arrange both electric paths will still fall within the scope of the current invention, which not limited to this preferred embodiment and example. In the embodiment of FIG. 3-3, each edge of the preferred has two slide surfaces and two receiving-holes, one connected with the positive path and the opposite with the negative path. The top or lower level may use the same shape of electric path as path (CC1) as long as it accommodates some angle adjustment. Both the top and lower level will use the same conductive-means to fit both levels. The electric path (CC1) is connected with an incoming electric signal at point "P+" and may also be connected with a lot of other electric components such as an LED, switch means, sensor means, I.C., and timer-means at the positions (L-D) (L-C) (401). The electric route (CC2) shows how simple it is to do this by traditional or conventional skill, for example by soldering to connect the electric components, timer-means, switch means, and/or sensor means terminals (43) at soldering point (42) to connect with electric path (CC2). The conductive means also can easily be designed to include a good electric contact-set (44') (44") (44"') to make perfect electric connection inside of the receiving-hole with the incoming contact-bar of the joint-means in order to deliver the electric signal from the housing-unit to the joint-means.

Figures 34, 62:
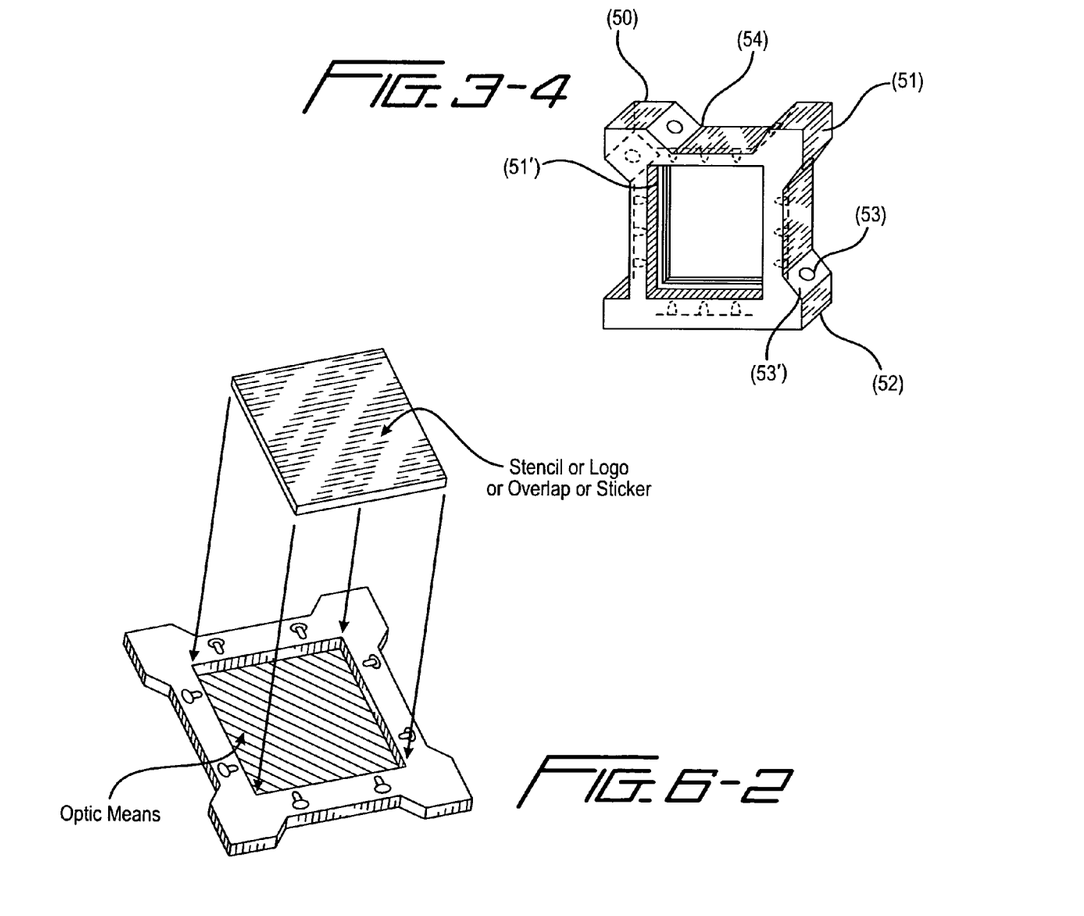

FIG. 3-4 shows a preferred LED arrangement inside two halves of a housing-unit, resulting in LED back light effects for a variety of applications involving promotion, in which an advertisement material is applied in front of the housing-unit to overlay an optics means.

Figure 35:
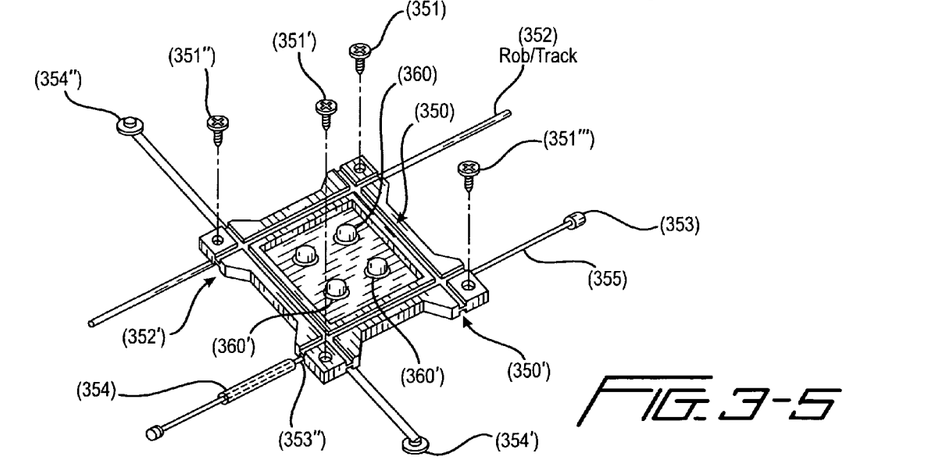
Figure 51:
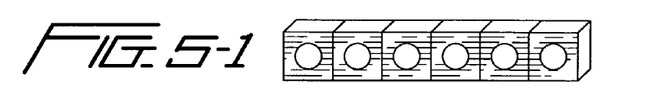
Figure 52:
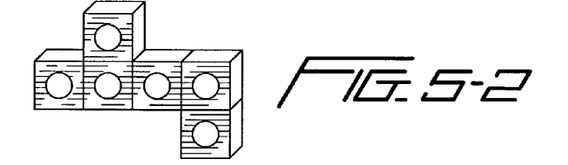
Figure 53:
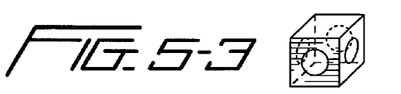
Figure 54:
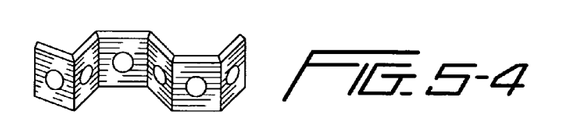
Figure 55:
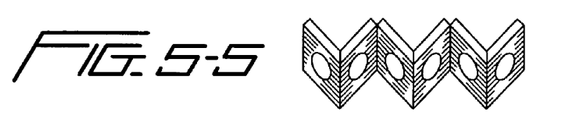

FIG. 3-5 shows a preferred embodiment having installation-means for installing the housing-unit on a main object by screws (351) (351') (351") (351"'). The main object can be a wall, under cabinet, closet etc., and also can be incorporated with a rope (354), track (352), or retractable tube (353) to install the said geometric system LED light device on these linear objects. However, unlike prior art linear objects, the invention can have a small size or dimension because, unlike the arrangement shown in FIG. 3-5, it does not utilize the feature used in conventional track lighting in which a power source extends the full length of the linear-object to supply 120 Volt AC, 240V AC, or 250V AC to each individual light-unit and which requires an individual transformer inside each unit, resulting in a big size to supply the final electric power to the individual light unit's light bulb, halogen, fluorescent tube, mercury lamp etc. This is too costly and too risky for lower position installation.

The current invention has a pre-arranged electric path within the housing-unit and joint-means so there is no need for any electric signal traveling along the track (352), rope or wire (354), or extendable tube (353). This is the greatest improvement compared with the conventional track lighting device using a halogen bulb, which has too many defects in comparison with an LED light device. The current invention uses LED light as a light source, which has benefits including: (1) less heat than a current track light with halogen bulb; (2) no need for a costly individual transformer and circuit box for each halogen bulb with high power consumption; (3) no need for a dangerously high voltage current to travel along the track, rope, wire, or tube; (4) no heavy weight hanging from a high position; (5) no need for a higher location installation to prevent people from being injured by the high voltage and high temperature of the halogen bulb; (6) no need for an additional bend and shape means for the LED light device because the light device of the invention already has geometric dimension changeable features with locking-means to lock a desired angle, gear-means to adjust the angle freely, extractable contact-bars to tightly connect to other housing-units and joint-means, and heavy load-bearing capability due to rigid contact-bars being deeply inserted into the housing-unit receiving holes; (7) no need for an additional geometric light device dimension changeable feature other than that already incorporated into the current invention; and (8) no way to have area light or advertisement because the conventional halogen light unit is to hot to allow any other optics-means or advertisement-means to be added.

Figure 4:
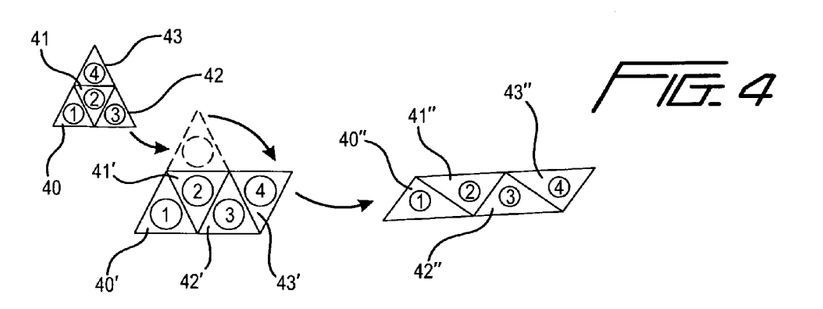
FIG. 4 shows another preferred embodiment of an LED light device including housing-units and joint-means that can be changed to a desired combination of orientation, position, light emitting direction, light device shape, dimension, size, illuminated areas, viewing angle, light device value, and light device light photometric performance.

FIG. 4 shows a preferred embodiment of an LED light device which has four "equilateral triangles" (40) (41) (42) (43), each equilateral triangle being connected together by joint-means (not shown) to deliver an electric signal from a power source (not shown) to each of LED(s) (1) (2) (3) (4) within the said each equilateral triangle housing-unit (40) (41) (42) (43) for a desired light performance.

This embodiment also provides housing-units and joint means that are rotatable, gap jumpable, extendable, foldable, distance changing, extractable, connectable, disconnectable, retractable, expandable, addable, adjustable, bendable, overlapable, underlayable, assembleable, disassembleable, flexible, and deformable. For example, a plurality of equilateral triangle and joint-means can be put together to expand the size, length, brightness, dimension, light output, illumination area, viewing-angle etc. A big triangle made of four housing-units (40) (41) (42) (43) which are in the form of the equilateral triangles (40) (41) (42) (43), and can be changed to a parallelogram shape arrangement (40") (41") (42") (43") by simply moving the equilateral triangles (43) to new positions (43'). Each housing-unit is equal to one equilateral triangle.

FIGS. 5-1, 5-2, 5-3, 5-4, 5-5 show an LED light device which has the properties discussed above, i.e., in which the light device is rotatable, gap jumpable, extendable, foldable, distance variable, extractable, connectable, disconnectable, retractable, expandable, addable, adjustable, bendable, overlapable, underlayable, assembleable, disassembleable, and/or flexible. All of the embodiments illustrated in FIGS. 5-1 to 5-5 exhibit these properties because all of the housing-units and joint-means have the same basic geometric shape and construction, with some differences in LED numbers or small details.

As shown in FIGS. 5-1 to 5-5, each of the housing-units are the same, with joint-means connecting each of the housing units. Each housing-unit can have four sides to connect with joint-means to make a variety of geometric shapes, such as the straight line arrangement for six pieces shown in FIGS. 5-1. FIGS. 5-2 shows six housing-units arranged like a square box-opened diagram. FIGS. 5-3 shows the resulting of folding the arrangement of FIGS. 5-2 into a six-sided square box. FIGS. 5-4 shows six housing-units arranged in a curved shape. FIGS. 5-5, shows three pieces arranged in a "V" shape. Thus, it can be seen that a very wide range of applications can be made using a limited number of geometric housing-unit shapes to create a lot of finished goods with different geometric shapes. This is concept similar to that used by Lego™ toys but in a lighting context. As long as we have a proper circuit arrangement for the housing-units and joint-means to allow the power source electric signal to be delivered from a power source to the desired LEDs for a pre-determined light performance, then the current invention can create a Universal LED light device for people to use anywhere people will stay.

The current invention is an improvement over the conventional LED light device which is limited to a fixed shape, fixed illumination areas, fixed brightness, fixed viewing angle, fixed design, and bad size for different locations. No conventional LED light device can fit anywhere, with addable brightness and illumination areas, and which is bendable to, for example, form a wine rack under a cabinet, or to provide an additional hook function to hang any items inside a kitchen, living room, bathroom, kids room, entertainment room, garden, patio, boat, car, van, bus, truck, train, airplane, transportation equipment, play ground, or outdoors, and which meets most economic and environmental concerns, as discussed above.

Figure 6:
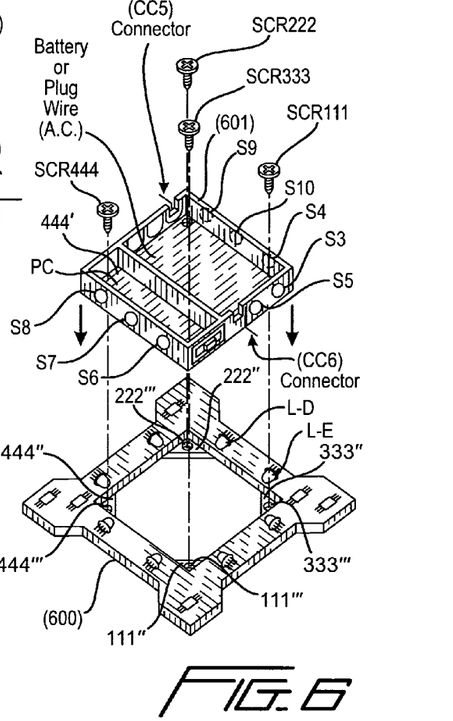
FIG. 6 another preferred embodiment of a LED light device with details of a housing-unit and compartments into which can be loaded a power source, circuit means, switch means, sensor means, I.C., connected means, and electric means, and for which selected fastening means can be applied to fasten the compartment within the housing-unit.

As shown in FIG. 6, the preferred embodiment includes a housing-unit (600) having installed thereon a plurality of LEDs (L-D) (L-E) with desired specifications but in different forms. The preferred power pack (601) can be fixed on the housing-unit (600) by screws (SCR 111) (SCR222) (SCR333)(SCR444) to pass through the power pack's (601) holes and hold-means holes (111") (222") (333") (444") to attach the hold-means (111''') (222''')(333''') (444'''). The power pack (601) can include batteries for D.C., a plug and wire for A.C., switch means (S6) (S7) (S8), sensor means (S3) (S4), timer-means (S9) (S10), or other electric components that can be selected from conventional market-available models to get desired light functions. The extra space (444') can load any circuit means, printed circuit board (PCB), or big electric components within.

Figure 61:
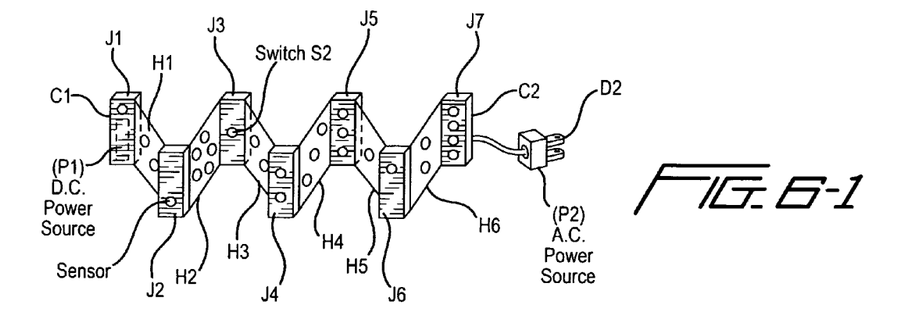

As shown in FIGS. 6-1, the LED light device with changeable geometric dimension may include at least one LED installed within a housing-unit or joint-means on any of an x, y, or z axis, with the housing-units connected by at least one joint-means arranged to deliver an electric signal from a power source to desired LEDs incorporated with an Integrated Circuit, circuit means, switch means, sensor means, and/or conductive means for illumination having a pre-determined light performance. The LED light device's geometric dimension will be changed when any variation is applied to the original housing-unit or joint-means. The LED light device includes conventional attachment means to be installed on any main object. FIGS. 6-1 shows housing-units (H1) (H2) (H3) (H4) (H5) (H6) connected by joint-means (J1) (J2) (J3)(J4) (J5)(J6). Housing-units (H1) (H2) (H3) (H4) (H5) (H6) have LEDs install anywhere at desired locations along the x, y, and z axes. The LED number can be 1 to N (N=any number). Similarly, joint-means (J1) (J2) (J3)(J4) (J5)(J6) may have LEDs installed anywhere at desired locations along the x, y, or z axes. The power source (P1) (P2) can be in form of alternating current (A.C.) or direct current (D.C.) and may incorporate circuit means (not shown), conductive means (not shown), sensor means (S1), switch means (S2), and other electric components (not shown) selected from conventional market-available units to deliver electric signals from the power source to desired LEDs. A D.C. power source can be installed within the housing-unit or joint-means' compartment (C1) because LED power consumption is very small and requires only a simple circuit. An A.C. power source may have circuit means, switch means, sensor means, conductive means, a wire, and/or a plug which can be well arranged in a proper space, room, or compartment of the light device. In the current preferred embodiment, the wire and plug (P2) can be arranged to fit into the compartment (C2) of the joint-means (J7) so as to supply an A.C. current to the LED light device.

The housing-unit and joint-means may have a size or dimension that allows D.C. power source kits (P1) or A.C. Power source kits (P2) to be arranged for a best cosmetic appearance and maximum value. In addition, a proper surface texture, printing, or treatment to resemble a wooden, marlboro, mosaic, brick, glass, metalized, enameled brick, vitreous brick, vitrified brick, glazement tile texture or finish to provide the best value for the LED light kits.

As shown in FIGS. 6-2, a stencil with optic means and lens can be added on the housing unit to get desired promotion medium effects.

Figures 11, 81:
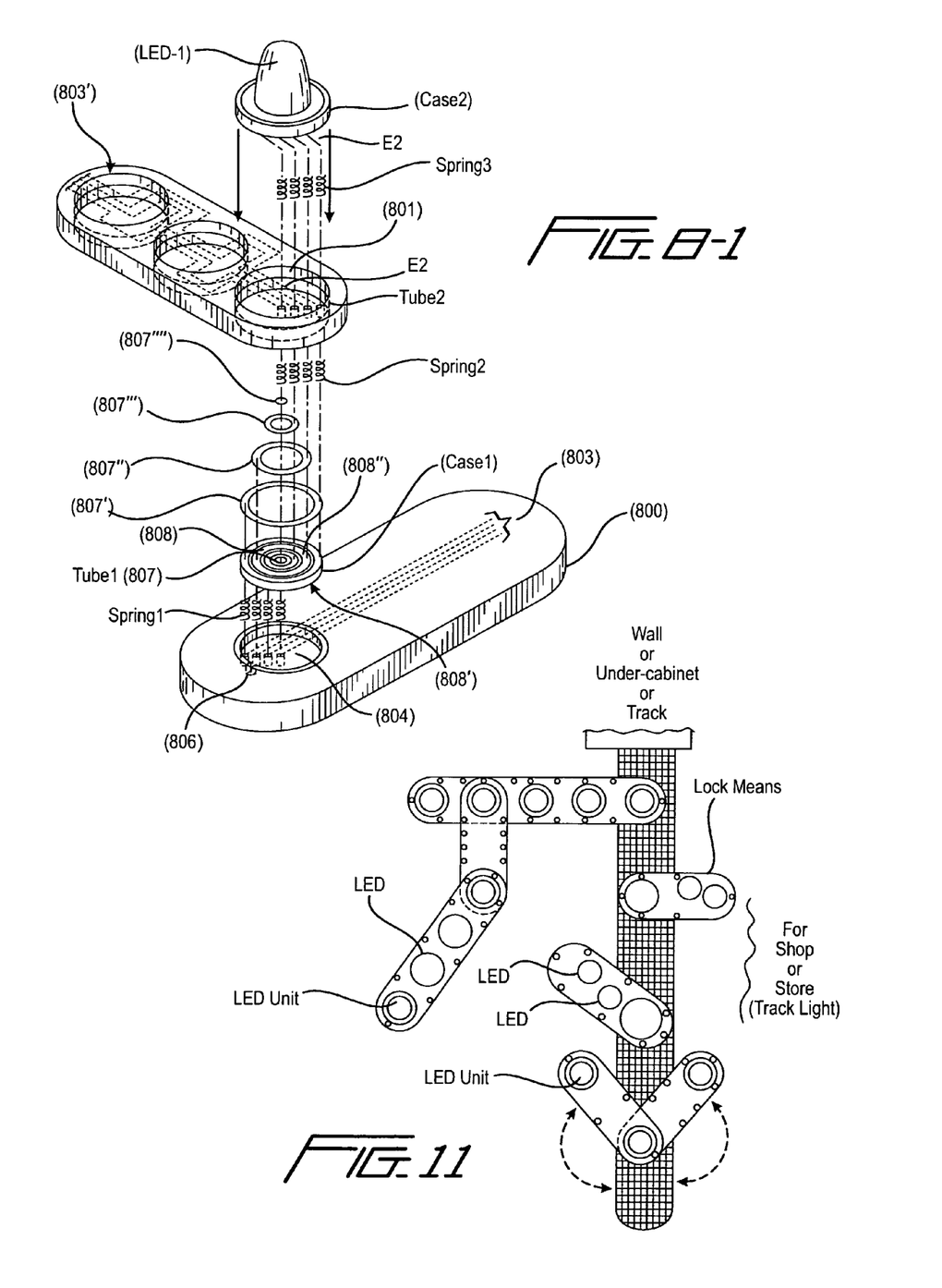

FIGS. 8-1 shows an electric connection arrangement for a changeable geometric system which has two housing-units (800) (801) having at least one set of conductive resilient means (spring 1) connected between a first set of linear-conductive means (803) on surface (804) and one set of circular-conductive means (807')(807") (807''')(807'''') having a lower surface (808') to change the relative linear-conductive (803) in-parallel position to a circular-conductive (808) in-diameter relation.

As second set of conductive resilient means (spring 2) provides contact between the circular-conductive means (808) having an upper surface (808") and a second set of linear-conductive means (803') to change the circular-conductive (808) in-diameter circular relation back to a linear-conductive (803') in-parallel position.

The electric signal delivery from the first linear-conductive means (803) thus passes through the first set of conductive resilient means (Spring 1), then passes through the circular-conductive means (808) lower surface (808') and upper surface (808"), and then passes through the second conductive resilient means (Spring2) to the second set of linear-conductive means (803') to delivery an electric signal from the first linear conductive means (803) to the second linear conductive means (803').

The first housing-unit (800) of the LED light with changeable geometric system has the first linear conductive means (803) and first conductive resilient means (Spring1) and circuit-conductive means (808) within the first housing-unit (800) body. The second housing unit (801) of the LED light with changeable geometric system has the second linear conductive means (803') and second conductive resilient means (Spring2) within the second housing-unit (801) body. Therefore, the electric signal can be delivered from the first housing-unit (800) to the second housing-unit (801) while the two housing-units (800) (801) contact each other with a correct alignment of the first linear conductive means (803) first resilient means (Spring1) and first circular means (808), and the second resilient means (Spring2) and second linear conductive means (803') to cause illumination of the at least one of LED (LED-1) or LED-unit (not shown) under pre-determined functions provided by incorporating desired electric components, switch means, sensor means, timer means, an I.C, and/or an A.C. or D.C. power source.

At least one of the joint-means used to tightly assemble the first housing-unit and second housing-unit can be rotated a certain degree of angle to change the geometric system of the said LED light.

Figure 7:
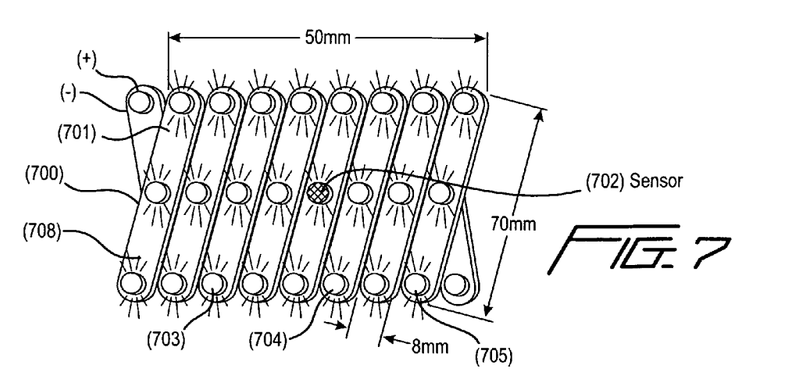
FIG. 7 shows a preferred embodiment of the LED light device in which at least one LED is installed within a housing-unit or joint-means at a desired location on an x, y, or z axis and the housing-units are connected by at least one joint-means which delivers an electric signal from a power source to desired LEDs incorporated with an Integrated Circuit, circuit means, switch means, and/or sensor means for illumination under pre-determined light performance, the LED light device's geometric dimension being changed whenever any variation is applied to the original housing-unit or joint-mean and further including a conventional attachment means to install the light device on any main object.

As shown in FIG. 7, the LED light device (700) has a top-grill housing-unit (708) and lower-grill housing-unit (701). The power source may be an alternating current power source or a battery power source depending on market requirements. The top housing-units (708) may have a desired number of LEDs installed within the housing-unit (708). Each top housing-unit (708) and lower housing-unit (701) is connected by conventional electric conductive means, which may include conductive resilient means, a conductive metal spring, a conductive metal ring, a conductive wire, and/or a conductive metal piece to supply electricity from the power source end (+) (−) to the first housing-unit, and from the first housing-unit to the last housing-unit to connect all of the LEDs in series or in parallel to meet marketing requirements.

It will be appreciated that the current LED light device may be incorporated with sensor means (702), such as a motion or photo sensor when the power source is a battery so as to save power. The device can also include another type of sensor or switch as discussed above. To provide greater practicality, some locations (703), (704), (705) may be designed as a hole with rotary features to install hooks, a post, a bar, or an electric device to increase the functions of the LED light device rather than just providing a light device. These additional holes can allow people to hang a cloth, jacket, hat, cap, bag, or even use the circuit to charge some batteries such as those of a communication device, cellular phone device, or other computer device which uses a battery. It is simple to just add one circuit means to drive the power source into a desired electric signal having a predetermined voltage and current to charge batteries used for communication, computer, or consumer products.

Figure 8:
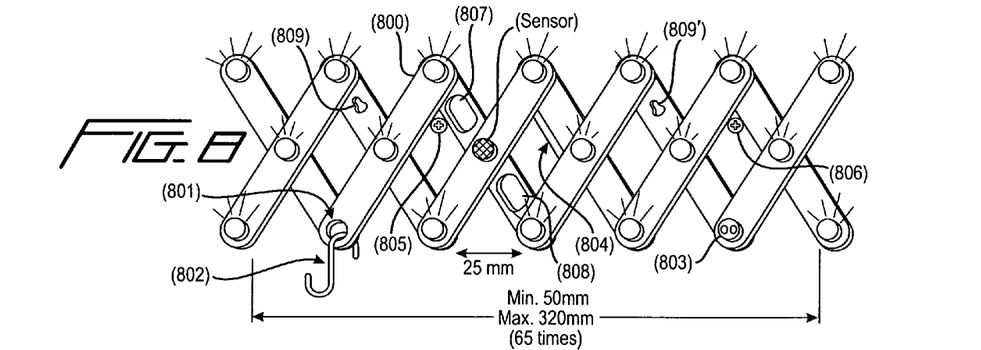

FIG. 8 shows the same embodiment as FIG. 7, but the LED light device has been extended to a longer length from that shown in FIG. 7, or example from a length of 50 mm to a length of 320 mm. Each joint point for the lower housing-unit and top housing-unit may be implemented by conventional available joint-means as discussed above.

The LED light device (800) may have attachment means selected from the group consisting of glue, double-side tape, foam tape (804), hook and loop tape, chemical adhesive material, screws (805) (806), phone hook and catches (809) (809'), holes (807) (808), rivets or a hold tray with attachment means.

As shown in FIG. 8, some of the flexible joint points (801) do not have an LED-unit installed thereon but rather just use a rivet or functionally equivalent joint-means so as to incorporate a pole, hook (802) or other metal or plastic device to allow the LED light device to offer other additional functions such as the ability to hang a cloth, cap, hat, or bag. The additional function can also be provided by an electric device or non-electric device.

FIG. 8 also shows a sensor means as discussed above, which may include a mechanical or electric type sensor selected from the group consisting of a photo sensor, motion sensor, timer, manual switch, humidity sensor, smoke sensor, heating sensor, magnetic sensor, and/or tilt sensor.

Figure 9:
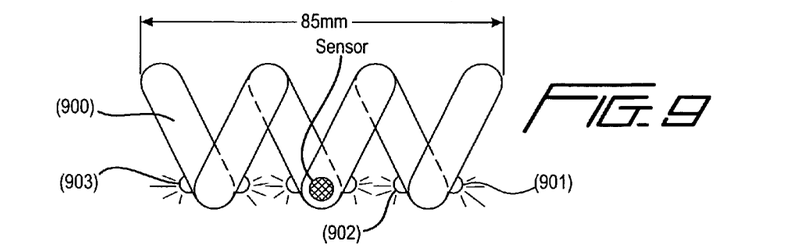
Figure 10:
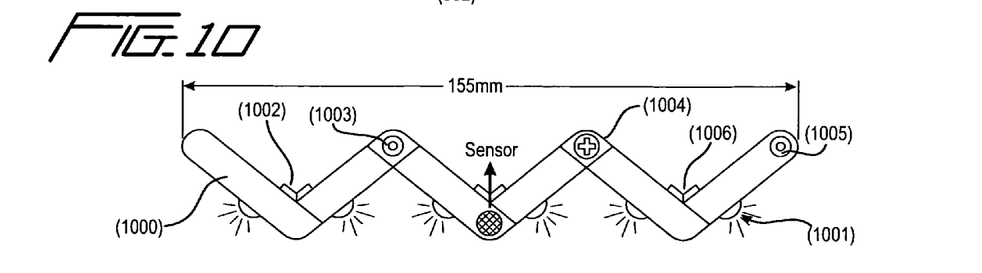

FIGS. 9, 10, 11 show a preferred embodiment which is extendable from a short length of 50 mm to, preferably, a length of 320 mm. This length may thus be extended almost 6.4 times. This LED light device can be changed in at least one or more of the following ways (a) the LED relative position with other LEDs can be changed, (b) the device shape can be changed, (c) the light emitting direction, position, and areas can be changed, (d) the number of LEDs also can be changed. The extendability may be achieved by conventional joint-means selected from the group consisting of a rivet, hinge, chain, screw, metal parts, plastic parts, rings, rotating means, snap means, hook means, cover means, or press-tight means from the conventional market and/or traditional skill in the art but is not limited thereto. The preferred embodiment also can use any equivalent method to get the same function to make the light device extendable and change the size, dimensions, and/or geometric configuration of the device. It will also be appreciated that each housing-unit may have different dimensions or properties including length, width, thickness, shape, geometric design, finish, and/or markings, and is not limited to one size. It can be very small for infant toy use or big up to "China Great Wall" size. The current invention can have any desired size as long as it has proper dimension for each housing-unit, so as to easily get desired features to use for all different spaces where human beings stay, including indoors and outdoors.

The illustrated embodiments are just examples. For example, the one-dimensional example need not be limited to folding and extension from 50 mm to 320 mm, but rather can be made smaller or larger, up to kilometers or miles range.

FIGS. 9 and 10 show extendable features that make the conventional LED light device become a universal light device to allow the consumer to install it in more locations with less limitation. The LED light device as discussed above may be incorporated with sensor means selected from the group consisting of mechanical or electric type sensors selected from the group consisting of a photo sensor, motion sensor, timer, manual switch, humidity sensor, smoke sensor, heating sensor, magnetic sensor, and/or tilt sensor.

The LED light device of FIGS. 9 and 10 preferably includes foldable or flexible changing features. The device shown in FIG. 10 has a length of 155 mm, which is extended from the FIG. 9 folded length of only 85 mm. The preferred joint-means may be selected from a hinge (1002) (1006), rivet (1003), special screw (1004), or nuts (1005) as discussed above, but is not limited thereto and instead may include any equivalent function metal or plastic means to offer the flexible or folded properties of the housing-unit (1000). The LED-unit (1001) may use features of the embodiments that allow the LED-unit to also have an adjustable angle so that the LED light beam can be emit to desired location, or to be adjusted in three dimensions as discussed above.

As shown in FIG. 10, the sensor means may be used in a preferred embodiment when the power source (not shown) is a battery so as to provide good power saving by means of a motion sensor, photo sensor, or any combination of conventional market-available switch and sensor combinations.

As shown in FIG. 11, the locking means may be in the form of small dots on each of housing-units, which can have a pin-button shape to hold and lock the housing-units at a desired position with respect to each other through locking-holes. The pin-button lock means also can provide a stopper function to freeze, hold, and lock the housing-units to other housing-units. The housing-units can be installed on a desired net-wall, hanger, track, wire, or any surface by conventional installation means, which may selected from the group consisting of a screw, rivet, glue, snap-tight, insert, press-tight, staple, metal nail, or other installation-means available from the conventional market.

While the above-discussed and mentioned preferred embodiments show the scope of the current invention, it is to be appreciated that any alternative or equivalent functions or design still within the scope of the invention, which is not limited to the above-discussed and mentioned details. Any alternative or equivalent arrangement, process, installation or the like, or any other changes from the above embodiments may still fall within the scope of the current invention.

The invention claimed is:

1. A geometric system, comprising:
    at least one housing-unit having a desired shape with two slide wall channels on each edge to receive a joint-means for joining said housing-units, each slide wall channels having one receiving hole for receiving a contact bar of the joint means;
    locking means for locking said housing-units and joint-means in fixed relative positions; and
    gear means in said joint-means for enabling relative movement of said housing-units when said locking means is not applied,
    wherein at least one of the joint means includes four extractable elastic said contact bars to permit assembly and disassembly of the joint-means to and from a respective receiving hole of the slide wall channels,
    whereby when said locking means is not applied, a shape, angle, configuration, or construction of the lighting device is freely changeable by a user, and whereby application of the locking means prevents changing of the shape, angle, configuration, or construction of the lighting device.

2. An LED light device with a changeable geometric system, comprising:
    at least one housing-unit and joint-means including pre-arranged conductive means for electrically connecting with a desired number of receiving holes to build an electric path for delivering electric signals to output ends of the housing-unit and joint-means;
    at least one LED connected with the electric path with the body of the housing-unit or joint-means to cause the LED to illuminate with a predetermined light performance, said light device including components selected from the group consisting of a power source, electric components, switch means, sensor means, an integrated circuit, timer means, resilient conductive means, a conductive metal piece, and a conductive spring coil;
    locking means for locking said housing-units and joint-means in fixed relative positions; and
    gear means in said joint-means for enabling relative movement of said housing-units when said locking means is not applied,
    wherein at least one of the joint means includes four extractable elastic said contact bars to permit assembly and disassembly of the joint-means to and from a respective receiving hole in an edge of the housing-unit, and
    wherein when said locking means is not applied, a shape, angle, configuration, or construction of the lighting device is freely changeable by a user, and whereby application of the locking means prevents changing of the shape, angle, configuration, or construction of the lighting device.

3. An LED light with track means, comprising:
    at least one LED or LED-unit installed with a geometric system, the geometric system being installed on a linear element selected from a wire, cord, track, cable, metal tube, or plastic tube,
    wherein the LED or LED-unit incorporates electrical components including components selected from the group consisting of sensor means, switch means, circuit means, an integrated circuit, a power source, and conductors for providing electric power to said LED or LED-unit,
    the improvement wherein the geometric system includes housing-units and joint-means for connecting the housing-units, said joint-means both joining said housing-units and providing an electric signal path for supplying power to said LED or LED-unit, said joint means permitting relative movement of said housing-units to a desired angle, orientation, position, or shape when a locking means is not applied, and said joint means being locked into a fixed position to prevent relative movement of said housing-units when the locking means is applied, and said linear element providing a support function only, rather than an electrical path.

4. An electric connection arrangement for an LED light with a changeable geometric system, comprising:
    at least one set of conductive resilient means connected between a first set of linear-conductive means on a surface and one set of circular-conductive means having a lower surface to change the relative linear-conductive in-parallel position to a circular-conductive in-diameter relation;
    a second set of conductive resilient means that provides contact between the circular-conductive means having an upper surface and a second set of linear-conductive means to change the circular-conductive in-diameter circular relation back to a linear-conductive in-parallel position,
    wherein an electric signal path from the first linear-conductive means passes through the first set of conductive resilient means, then passes through the circular-conductive means lower surface and upper surface, and then passes through the second conductive resilient means to the second set of linear-conductive means to deliver an electric signal from the first linear conductive means to the second linear conductive means,
    wherein a first housing-unit of the LED light with changeable geometric system has the first linear conductive means and first conductive resilient means and circuit-conductive means within the first housing-unit body,
    wherein a second housing unit of the LED light with changeable geometric system has the second linear conductive means and second conductive resilient means within the second housing-unit body, and
    wherein the electric signal is delivered from the first housing-unit to the second housing-unit while the two housing-units contact each other with a correct alignment of the first linear conductive means first resilient means and first circular means), and the second resilient means and second linear conductive means to cause illumination of at least one of LED or LED-unit under pre-determined functions provided by incorporating desired electric components, switch means, sensor means, timer means, an I.C, and/or an A.C. or D.C. power source.

* * * * *